US011203510B2

(12) United States Patent
Witczak et al.

(10) Patent No.: US 11,203,510 B2
(45) Date of Patent: Dec. 21, 2021

(54) ELECTROHYDRAULIC DAMPER FOR ELEVATOR SYSTEM

(71) Applicant: Otis Elevator Company, Farmington, CT (US)

(72) Inventors: Tadeusz Pawel Witczak, Farmington, CT (US); Cezary Jedryczka, Lniano (PL); Wojciech Szelag, Poznan (PL); Adam Marian Myszkowski, Ostrow Wlkp (PL)

(73) Assignee: OTIS ELEVATOR COMPANY, Farmington, CT (US)

( * ) Notice: Subject to any disclaimer, the term of this patent is extended or adjusted under 35 U.S.C. 154(b) by 669 days.

(21) Appl. No.: 16/050,307

(22) Filed: Jul. 31, 2018

(65) Prior Publication Data

US 2020/0039788 A1  Feb. 6, 2020

(51) Int. Cl.
*B66B 1/32* (2006.01)
*B66B 5/18* (2006.01)
(Continued)

(52) U.S. Cl.
CPC ............... *B66B 5/18* (2013.01); *B66B 1/365* (2013.01); *F16D 65/14* (2013.01); *F16D 66/023* (2013.01);
(Continued)

(58) Field of Classification Search
CPC ........... B60T 13/22; B66B 5/18; B66B 1/365; B66B 1/32; F16D 65/16
(Continued)

(56) References Cited

U.S. PATENT DOCUMENTS

| 3,901,358 A | 8/1975 | Dixon |
| 5,601,163 A * | 2/1997 | Kent ...................... B60T 15/02 |
| | | 188/170 |

(Continued)

FOREIGN PATENT DOCUMENTS

| CN | 2784387 Y | 5/2006 |
| CN | 202732804 U | 2/2013 |

(Continued)

OTHER PUBLICATIONS

European Search Report for European Application No. 19189321.3, dated Feb. 27, 2020, 6 pages.

*Primary Examiner* — Christopher P Schwartz
(74) *Attorney, Agent, or Firm* — Cantor Colburn LLP (57) ABSTRACT

A frictional damper for an elevator system includes one or more friction pads configured to move between a first position, and a second position defined by engagement of the one or more friction pads to the guide rail. An actuation unit urges the one or more friction pads into and out of engagement with the guide rail. The actuation unit includes a hydraulic actuator operably connected to the one or more friction pads to urge movement of the one or more friction pads into and out of engagement with the guide rail via hydraulic fluid pressure. The hydraulic actuator includes a hydraulic cylinder containing a volume of hydraulic fluid and a hydraulic piston located in the hydraulic cylinder and operably connected to the one or more friction pads. An electromagnetic actuator selectably urges hydraulic fluid to apply a force to the hydraulic piston, urging the movement of the friction pads.

18 Claims, 5 Drawing Sheets

(51) Int. Cl.
*B66B 1/36* (2006.01)
*F16D 65/14* (2006.01)
*F16D 66/02* (2006.01)
*F16D 121/04* (2012.01)
*F16D 121/20* (2012.01)

(52) U.S. Cl.
CPC ...... *F16D 2121/04* (2013.01); *F16D 2121/20* (2013.01)

(58) Field of Classification Search
USPC ....... 187/275, 288, 349, 351, 359, 373, 374, 187/376, 409; 188/156, 158, 161, 163, 188/170, 182, 184, 187
See application file for complete search history.

(56) References Cited

U.S. PATENT DOCUMENTS

| | | | |
|---|---|---|---|
| 5,648,644 A * | 7/1997 | Nagel | B66B 5/18 187/288 |
| 6,033,034 A | 3/2000 | Elkins | |
| 6,193,026 B1 * | 2/2001 | Sevilleja | B60T 13/22 187/288 |
| 9,688,510 B2 * | 6/2017 | Strbuncelj | B66B 1/365 |
| 10,737,905 B2 * | 8/2020 | Bhosale | B66B 1/32 |
| 2011/0226560 A1 * | 9/2011 | Husmann | B66B 5/18 187/359 |
| 2013/0277152 A1 | 10/2013 | Fargo et al. | |
| 2015/0114762 A1 | 4/2015 | Olkkonen et al. | |
| 2015/0259175 A1 * | 9/2015 | West | F16D 63/008 187/359 |
| 2019/0322249 A1 * | 10/2019 | Di Stefano | B60T 8/172 |
| 2020/0270097 A1 * | 8/2020 | Robibero | B66B 5/0031 |

FOREIGN PATENT DOCUMENTS

| | | |
|---|---|---|
| CN | 203976292 U | 12/2014 |
| CN | 104444919 A | 3/2015 |
| CN | 207226891 U | 4/2018 |
| DE | 2757081 A1 | 6/1979 |
| DE | 102008037720 A1 | 2/2010 |
| DE | 102013014124 A1 | 8/2014 |
| EP | 1323660 A1 | 7/2003 |
| EP | 2674381 A1 | 12/2013 |
| GB | 1277986 A | 6/1972 |
| JP | H0495643 A | 3/1992 |
| WO | 2017137140 A1 | 8/2017 |

\* cited by examiner

ELECTROHYDRAULIC DAMPER FOR ELEVATOR SYSTEM

BACKGROUND

Exemplary embodiments pertain to the art of elevator systems, and more particularly to frictional damping systems for elevator systems.

Elevator systems include a machine for moving the elevator car to provide elevator service. In traction-based systems a one or more suspension members suspend the weight of the elevator car and a counterweight. Traction between the suspension members and a traction sheave that is moved by the elevator machine provides the ability to move the elevator car as desired.

When the rise of an elevator system is sufficiently large, the longer suspension members introduce the possibility for an elevator car to bounce or oscillate as a result of a change in load while the elevator car is at a landing. In some cases, elevator passengers may perceive a bounciness of the elevator car, which is undesirable.

Elevator systems often mechanical dampers mounted at an elevator car to hold the elevator car at the landing. The mechanical dampers use actuators and friction pads to frictionally engage a rail of the elevator system. The frictional engagement of the rail by the friction pads holds the elevator car at the desired position.

Over time, the friction pads wear due to usage of the mechanical damping system, resulting in performance issues with the system. These issues include sag or bounce of the elevator car with engagement of the system, which is unpleasant for the passenger of the elevator car. To compensate for expected friction pad wear, the system is designed for a large gap, due to wear of the friction pads, between the friction pad and the rail. As a result, actuators of the mechanical damping system must be designed to drive the friction pads across the large gap. This solution drives up cost of the actuators, and also increases noise when activating and deactivating the system because of control issues with the larger, longer stroke actuators.

BRIEF DESCRIPTION

In one embodiment, a frictional damper for an elevator system includes one or more friction pads configured to move between a first position defined by an air gap between the one or more friction pads and a guide rail of an elevator system, and a second position defined by engagement of the one or more friction pads to the guide rail. An actuation unit urges the one or more friction pads into and out of engagement with the guide rail. The actuation unit includes a hydraulic actuator operably connected to the one or more friction pads to urge movement of the one or more friction pads into and out of engagement with the guide rail via hydraulic fluid pressure. The hydraulic actuator includes a hydraulic cylinder containing a volume of hydraulic fluid and a hydraulic piston located in the hydraulic cylinder and operably connected to the one or more friction pads. An electromagnetic actuator is configured to selectably urge hydraulic fluid to apply a force to the hydraulic piston, thereby urging the movement of the one or more friction pads.

Additionally or alternatively, in this or other embodiments the fluid level in the hydraulic cylinder of the hydraulic actuator is increased to maintain a constant air gap between the one or more friction pads and the guide rail at the first position to compensate for wear of the one or more friction pads.

Additionally or alternatively, in this or other embodiments the air gap is four millimeters.

Additionally or alternatively, in this or other embodiments a first friction pad of the one or more friction pads is located at a first lateral side of the guide rail and a second friction pad of the one or more friction pads is located at a second lateral side of the guide rail, opposite the first lateral side.

Additionally or alternatively, in this or other embodiments the hydraulic actuator and the electromagnetic actuator are both located at the first lateral side and operably connected to the first friction pad.

Additionally or alternatively, in this or other embodiments a first actuation unit is operably connected to the first friction pad and a second actuation unit is operably connected to the second friction pad.

Additionally or alternatively, in this or other embodiments the actuation unit includes a first hydraulic actuator operably connected to the first friction pa, a second hydraulic actuator operably connected to the second friction pad, and a shared electromagnetic actuator operably connected to each of the first hydraulic cylinder and the second hydraulic cylinder.

Additionally or alternatively, in this or other embodiments one or more pad wear sensors are located at the one or more friction pads.

Additionally or alternatively, in this or other embodiments a position of the friction pads is biased to the first position via one or more biasing members located at the electromagnetic actuator.

Additionally or alternatively, in this or other embodiments a hydraulic reservoir is in fluid communication with the hydraulic actuator. The hydraulic reservoir is configured to increase a fluid level in the hydraulic cylinder to compensate for wear of the one or more friction pads.

Additionally or alternatively, in this or other embodiments a fluid level sensor is located at the hydraulic reservoir.

In another embodiment, an elevator system includes an elevator car located in a hoistway and movable along the hoistway and a frictional damper located at the elevator car. The frictional damper includes one or more friction pads configured to move between a first position defined by an air gap between the one or more friction pads and a guide rail, and a second position defined by engagement of the one or more friction pads to the guide rail. An actuation unit urges the one or more friction pads into and out of engagement with the guide rail. The actuation unit includes a hydraulic actuator operably connected to the one or more friction pads to urge movement of the one or more friction pads into and out of engagement with the guide rail via hydraulic fluid pressure. The hydraulic actuator includes a hydraulic cylinder containing a volume of hydraulic fluid, and a hydraulic piston disposed in the hydraulic cylinder and operably connected to the one or more friction pads. An electromagnetic actuator is configured to selectably urge hydraulic fluid to apply a force to the hydraulic piston, thereby urging the movement of the one or more friction pads.

Additionally or alternatively, in this or other embodiments the fluid level in the hydraulic cylinder of the hydraulic actuator is increased to maintain a constant air gap between the one or more friction pads and the guide rail at the first position.

Additionally or alternatively, in this or other embodiments a first friction pad of the one or more friction pads is located at a first lateral side of the guide rail and a second friction pad of the one or more friction pads is located at a second lateral side of the guide rail, opposite the first lateral side.

Additionally or alternatively, in this or other embodiments the hydraulic actuator and the electromagnetic actuator are both located at the first lateral side and operably connected to the first friction pad.

Additionally or alternatively, in this or other embodiments a first actuation unit operably is connected to the first friction pad and a second actuation unit is operably connected to the second friction pad.

Additionally or alternatively, in this or other embodiments the actuation unit includes a first hydraulic actuator operably connected to the first friction pad, a second hydraulic actuator operably connected to the second friction pad, and a shared electromagnetic actuator operably connected to each of the first hydraulic cylinder and the second hydraulic cylinder.

Additionally or alternatively, in this or other embodiments one or more pad wear sensors dare located at the one or more friction pads.

Additionally or alternatively, in this or other embodiments a hydraulic reservoir is in fluid communication with the hydraulic actuator. The hydraulic reservoir is configured to increase a fluid level in the hydraulic cylinder to compensate for wear of the one or more friction pads.

Additionally or alternatively, in this or other embodiments a fluid level sensor is located at the hydraulic reservoir.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
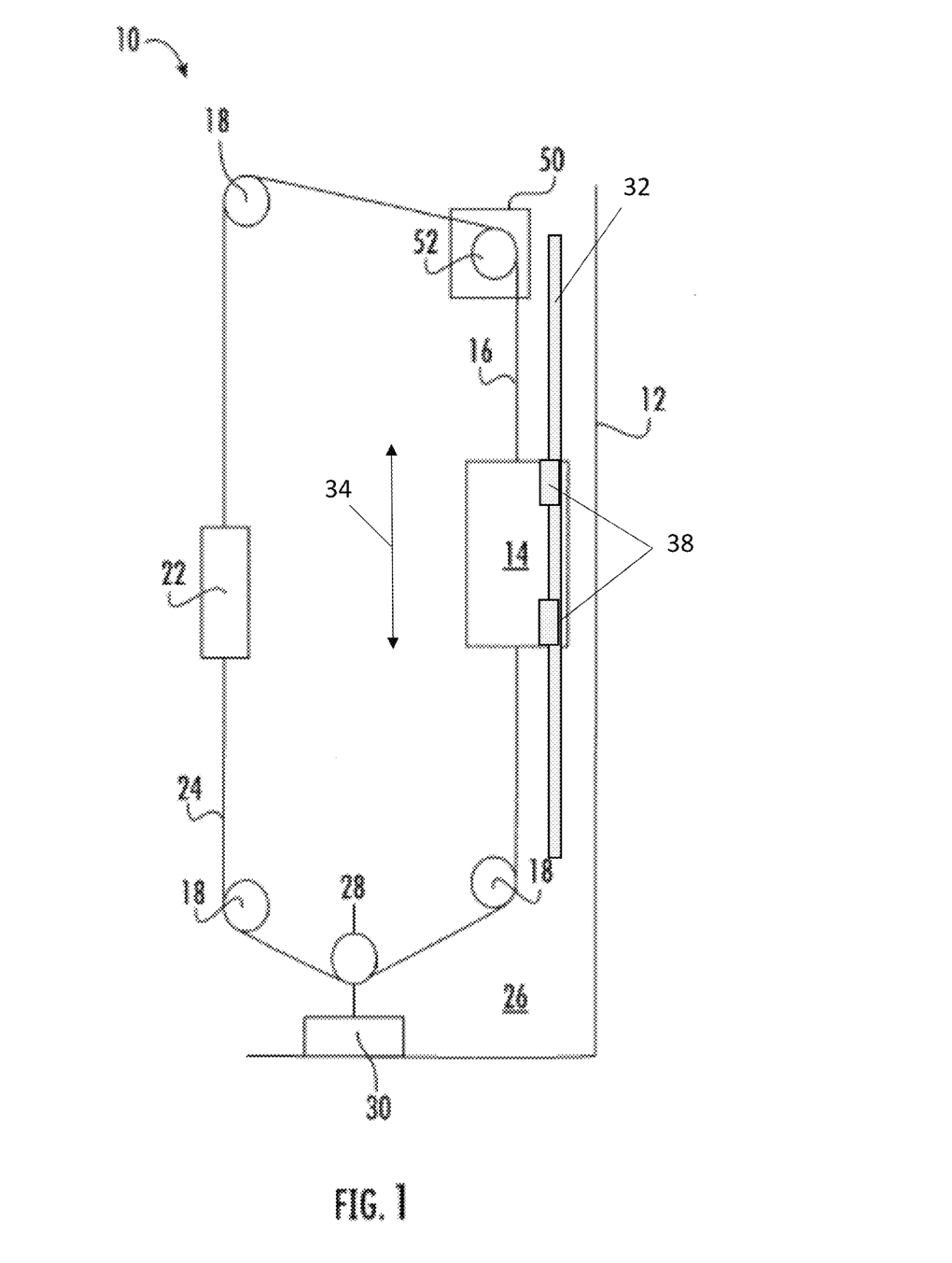
FIG. 1 is a schematic view of an elevator system

Shown in FIG. 1 is a schematic view of an exemplary traction elevator system 10. The elevator system 10 includes an elevator car 14 operatively suspended or supported in a hoistway 12 with one or more suspension members 16, for example, one or more belts. The one or more suspension members 16 interact with sheaves 18 and 52 to be routed around various components of the elevator system 10. Sheave 18 is configured as a diverter, deflector or idler sheave and sheave 52 is configured as a traction sheave, driven by a machine 50. Movement of the traction sheave 52 by the machine 50 drives, moves and/or propels (through traction) the one or more suspension members 16 that are routed around the traction sheave 52. Diverter, deflector or idler sheaves 18 are not driven by a machine 50, but help guide the one or more suspension members 16 around the various components of the elevator system 10. The one or more suspension members 16 could also be connected to a counterweight 22, which is used to help balance the elevator system 10 and reduce the difference in belt tension on both sides of the traction sheave during operation. The sheaves 18 and 52 each have a diameter, which may be the same or different from each other.

The elevator system 10 further includes one or more compensation and tie-down members 24 extending from the elevator car 14 toward a hoistway pit 26 around a tie-down sheave 28 and up to the counterweight 22. A tie-down mass 30 is disposed in the hoistway pit 26 and affixed to the tie-down sheave 28. The compensation and tie-down members 24, tie-down sheave 28 and tie-down mass 30 stabilize motion of the elevator car 14 along the hoistway 12.

One or more guide rails 32 are located in the hoistway 12 and extend along a length direction 34 of the hoistway 12. The elevator car 14 is guided along the guide rails 32 by one or more car guides (not shown) located at the elevator car 14. Further, the elevator car 14 includes one or more frictional dampers 38 at the elevator car 14, to hold the elevator car 14 at a selected position in the hoistway 12, preventing bounce or oscillation of the elevator car 14 by frictional engagement of the frictional dampers 38 to the guide rail 32.

Figure 2:
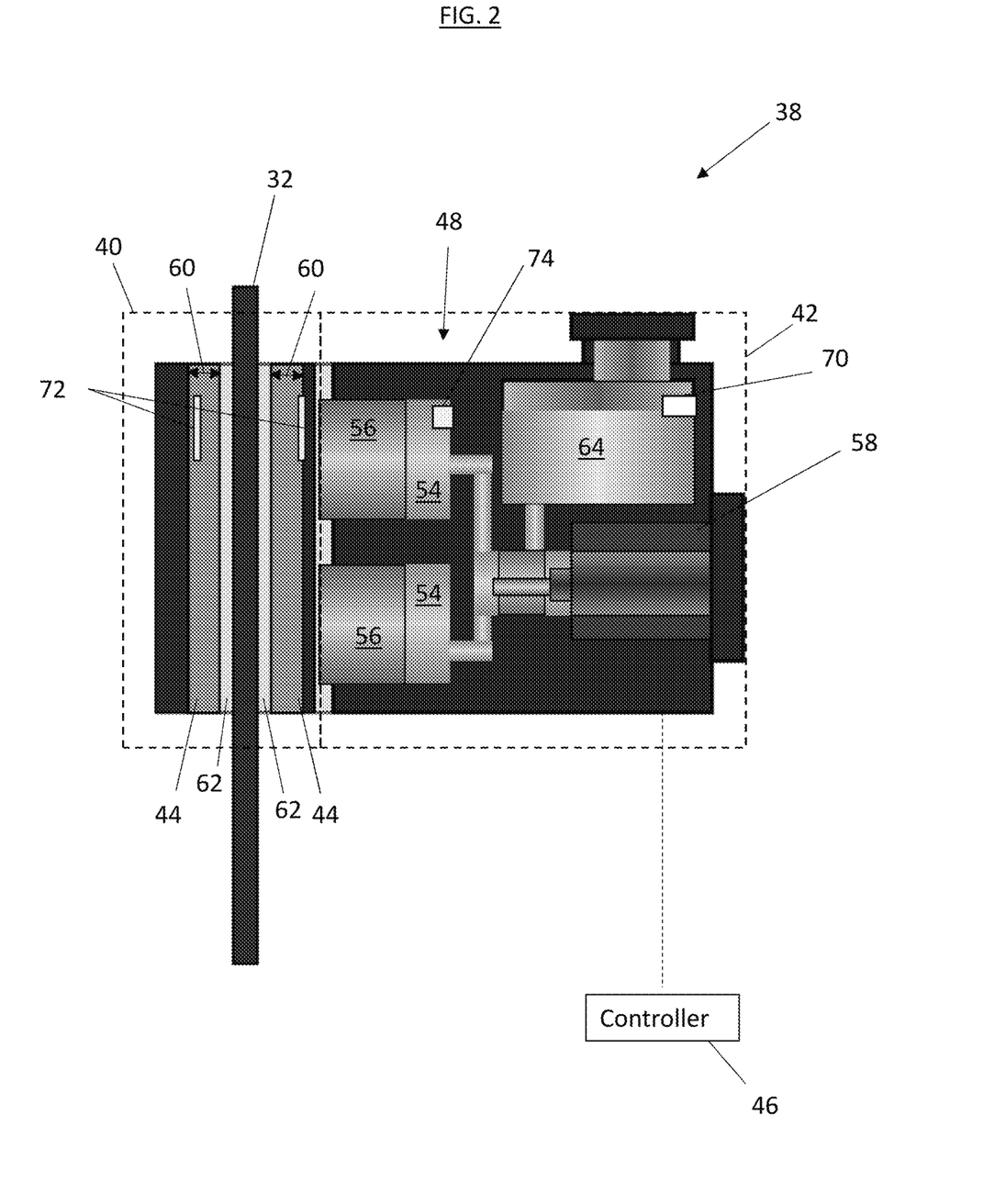
FIG. 2 is a cross-sectional view of an embodiment of a car or counterweight mounted friction damper of an elevator system.

Referring now to FIG. 2, an embodiment of a frictional damper 38 is illustrated. The frictional damper 38 includes a friction pad unit 40 operably coupled to an actuator unit 42. The friction pads unit 40 includes two or more friction pads 44 which are driven into and out of engagement with the guide rail 32 by the actuator unit 42. In some embodiments, the actuator unit 42 acts in response to signals from an elevator system controller 46.

The actuator unit 42 includes one or more hydraulic actuators 48 connected to the friction pads 44 to urge the frictions pads 44 into and out of contact with the guide rail 32. The hydraulic actuator 48 includes one or more piston chambers 54 containing a volume of hydraulic fluid. A hydraulic piston 56 is disposed in the piston chamber 54 and is located at the friction pads 44 to control movement of the friction pads 44. A direct electromagnetic actuator 58 is connected to the hydraulic actuator 48 such that when the electromagnetic actuator 58 is actuated, the piston chamber 54 is pressurized, urging the hydraulic piston 56 to drive the friction pads 44 into contact with the guide rail 32. When the electromagnetic actuator 58 is deactivated, the hydraulic piston 56 reverses its movement, moving the friction pads 44 out of contact with the guide rail 32. In some embodiments, one or more biasing members, such as springs or magnets, are disposed in an electromagnetic actuator housing to bias a position of the electromagnetic 58 actuator such that the friction pads 44 are biased into and/or out of contact with the guide rail 32.

Figure 3:
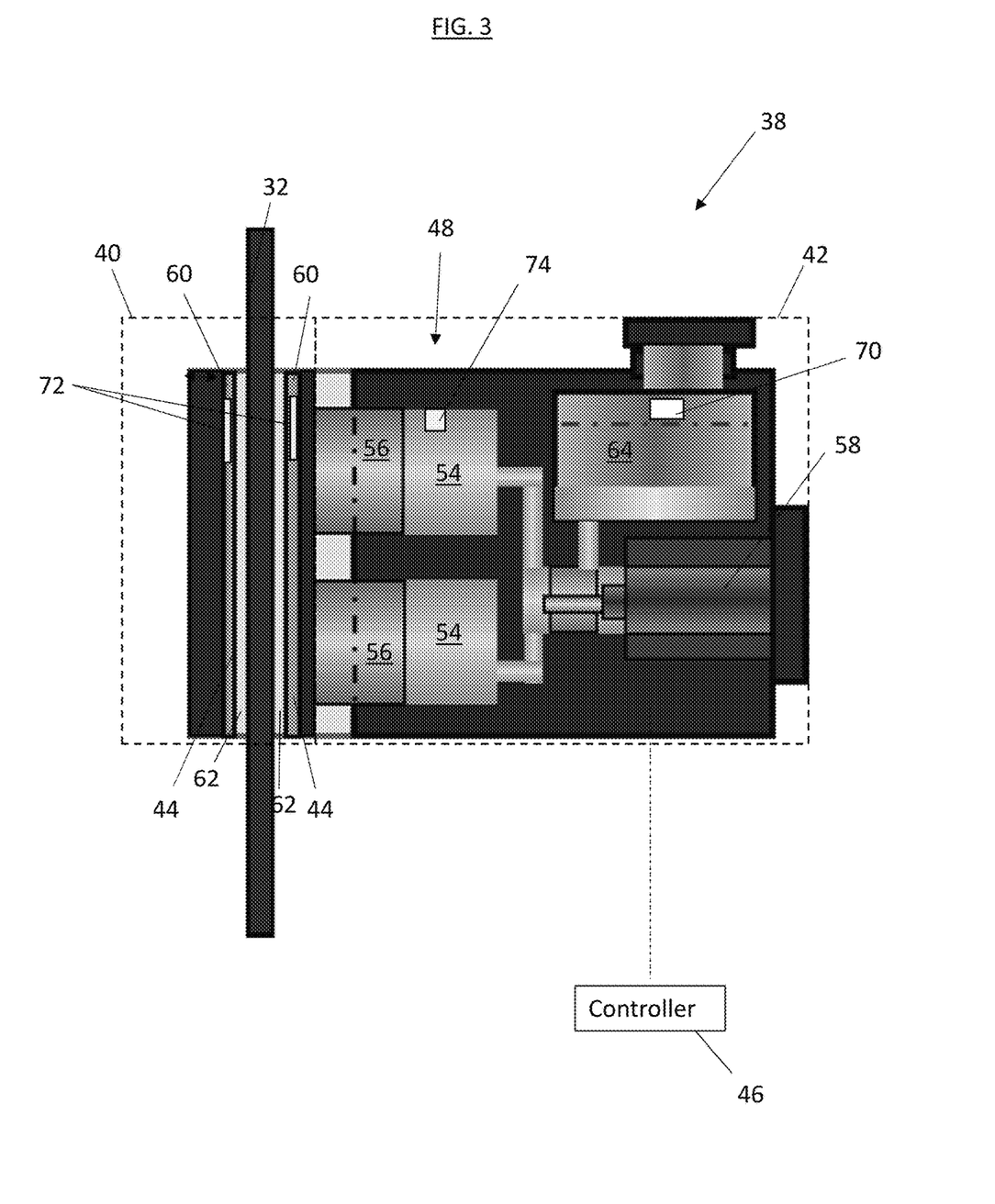
FIG. 3 is another cross-sectional view of an embodiment of a car or counterweight mounted friction damper of an elevator system.

Referring now to FIG. 3, over time the friction pads 44 wear, decreasing a friction pad thickness 60. To maintain a same air gap 62 between the friction pad 44 and the guide rail 32 when the hydraulic actuator 48 and the electromagnetic actuator 58 are in their respective retracted positions, additional hydraulic fluid is automatically introduced to the piston chambers 54 from a fluid reservoir 64 connected to the piston chambers 54, to maintain a selected hydraulic fluid pressure in the piston chambers 54, while also maintaining a consistent air gap, 62, for example, 4 millimeters, to compensate for wear of the friction pads 44.

Figure 4:
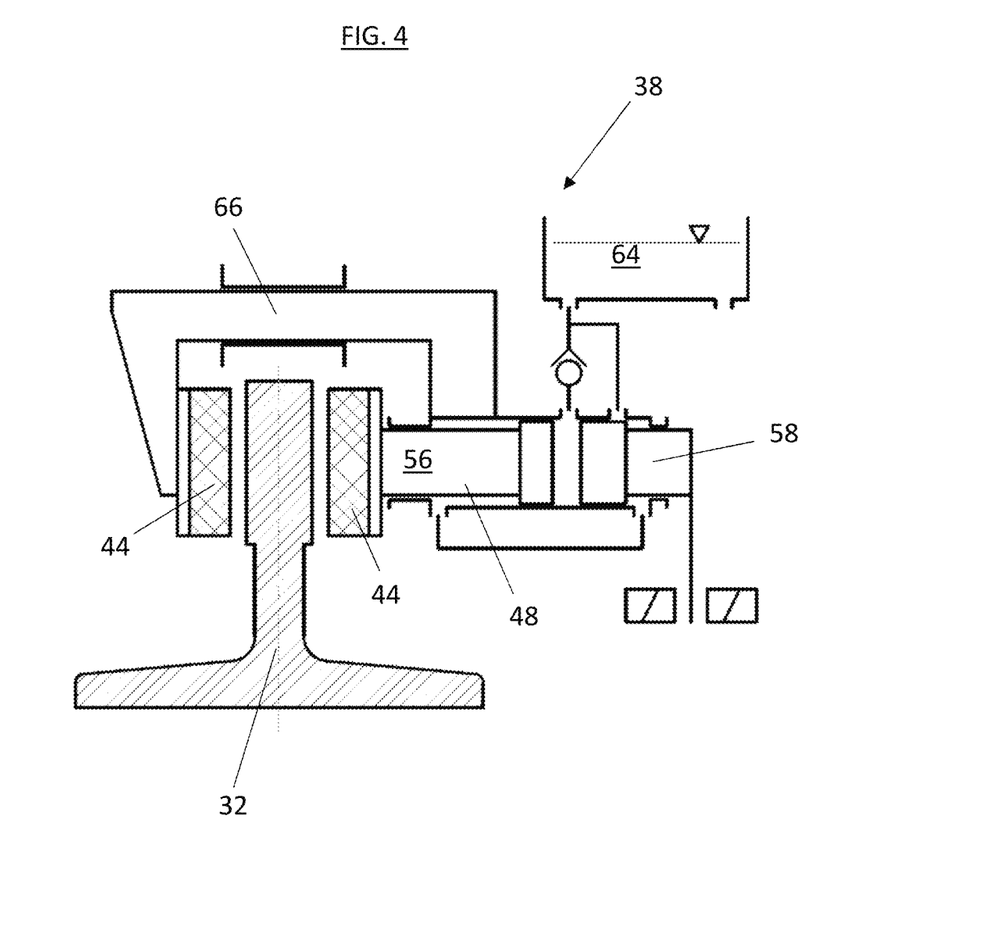
FIG. 4 is another cross-sectional view of an embodiment of a car or counterweight mounted friction damper of an elevator system.

FIG. 4 illustrates another view of the configuration of the frictional damper 38 of FIG. 3. In this embodiment, the frictional damper 38 is a single-side actuated configuration, with one hydraulic actuator 48 and one electromagnetic actuator 58, located at one lateral side of the guide rail 32. The friction pads 44 on opposing lateral sides of the guide rail 32 are connected by a bracket 66 extending across the guide rail 32.

Figure 5:
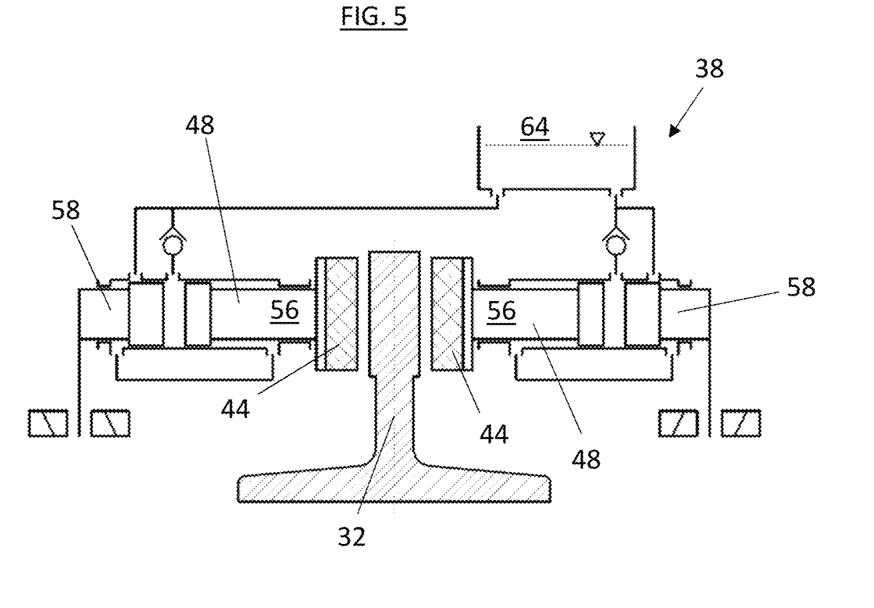
FIG. 5 is a cross-sectional view of another embodiment of a car or counterweight mounted friction damper of an elevator system.

Another embodiment is illustrated in FIG. 5, in which friction pads 44 on each lateral side of the guide rail 32 are each connected to and driven by separate hydraulic actuator 48 and electromagnetic actuator 58 arrangements. As shown in FIG. 5, the hydraulic actuators 48 are connected to a common fluid reservoir 64. It is to be appreciated, however, that in other embodiments separate hydraulic reservoirs may be utilized.

Figure 6:
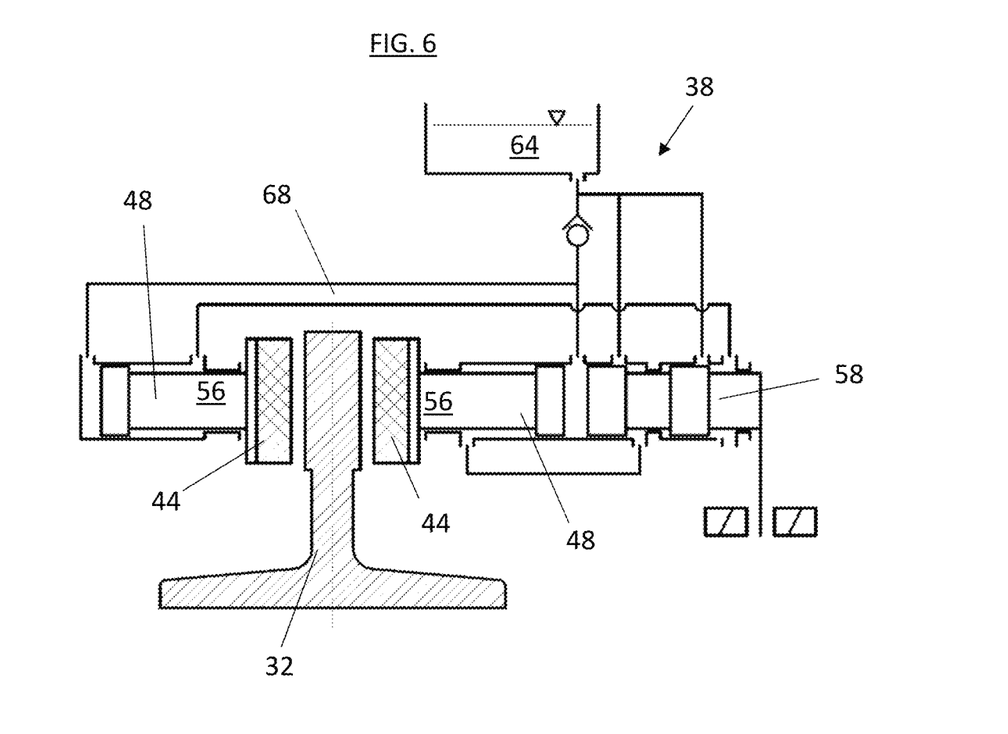
FIG. 6 is a cross-sectional view of yet another embodiment of a car or counterweight mounted friction damper of an elevator system.

Referring now to FIG. 6, friction pads 44 one each lateral side of the guide rail 32 are connected to and driven by separate hydraulic actuators 48. A common electromagnetic actuator 58 connected to both hydraulic actuators 48 is utilized to drive operation of the hydraulic actuators 48. The electromagnetic actuator 58 is located at, for example, a first lateral side of the guide rail 32 and connected to the hydraulic actuator 48 at the opposing lateral side of the guide rail 32 by hydraulic fluid lines 68. As in the embodiment of FIG. 5, the hydraulic actuators 48 are connected to a common fluid reservoir 64. It is to be appreciated, however, that in other embodiments separate hydraulic reservoirs may be utilized.

Referring again to FIG. 2, the frictional damper 38 may include one or more sensors to detect and monitor various conditions of the frictional damper 38. For example, a fluid level sensor 70 is located at the fluid reservoir 64 to monitor fluid level of the fluid reservoir 64. A decrease in fluid level at the fluid reservoir 64 may be indicative of wear of the friction pads 44, but ma also indicate leakage in the frictional damper 38. Wear sensors 72 are located at the friction pads 44 for a direct detection of friction pad 44 wear. When the friction pad thickness 60 goes below a selected threshold, an alarm or other indication of a need to replace the friction pads 44 will be triggered. Further, a hydraulic pressure sensor 74 is installed at, for example, the hydraulic actuator 48 to monitor hydraulic system pressure, which is indicative of force applied by the frictional damper 38.

The frictional damper 38 configurations disclosed herein present an easily adaptable, relatively low cost solution to managing frictional damper 38 operation taking into account friction pad 44 wear.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A frictional damper for an elevator system, comprising:
   one or more friction pads configured to move between a first position defined by an air gap between the one or more friction pads and a guide rail of an elevator system, and a second positon defined by engagement of the one or more friction pads to the guide rail; and
   at least one actuation unit to urge the one or more friction pads into and out of engagement with the guide rail, the at least one actuation unit including:
      at least one hydraulic actuator operably connected to the one or more friction pads to urge movement of the one or more friction pads into and out of engagement with the guide rail via hydraulic fluid pressure, the at least one hydraulic actuator including:
         a piston chamber containing a volume of hydraulic fluid; and
         a hydraulic piston disposed in the piston chamber and operably connected to the one or more friction pads;
      an electromagnetic actuator configured to selectably urge hydraulic fluid to apply a force to the hydraulic piston, thereby urging the movement of the one or more friction pads;
      wherein the fluid level in the piston chamber of the at least one hydraulic actuator is increased to maintain a constant air gap between the one or more friction pads and the guide rail at the first position to compensate for wear of the one or more friction pads.

2. The frictional damper of claim 1, wherein a first friction pad of the one or more friction pads is disposed at a first lateral side of the guide rail and a second friction pad of the one or more friction pads is disposed at a second lateral side of the guide rail, opposite the first lateral side.

3. The frictional damper of claim 2, wherein the at least one hydraulic actuator and the electromagnetic actuator are both disposed at the first lateral side and operably connected to the first friction pad.

4. The frictional damper of claim 2, wherein the at least one actuation unit includes:
   a first actuation unit operably connected to the first friction pad; and
   a second actuation unit operably connected to the second friction pad.

5. The frictional damper of claim 2, wherein an actuation unit of the at least one actuation unit includes:
   a first hydraulic actuator of the at least one hydraulic actuator operably connected to the first friction pad;
   a second hydraulic actuator of the at least one hydraulic actuator operably connected to the second friction pad; and
   a shared electromagnetic actuator operably connected to each of the first hydraulic actuator and the second hydraulic actuator.

6. The frictional damper of claim 1, further comprising a hydraulic reservoir in fluid communication with the at least one hydraulic actuator, the hydraulic reservoir configured to increase a fluid level in the piston chamber to compensate for wear of the one or more friction pads.

7. The frictional damper of claim 6, further comprising a fluid level sensor disposed at the hydraulic reservoir.

8. The frictional damper of claim 1, further comprising one or more pad wear sensors disposed at the one or more friction pads.

9. The frictional damper of claim 1, wherein a position of the friction pads is biased to the first position via one or more biasing members disposed at the electromagnetic actuator.

10. The frictional damper of claim 1, wherein the air gap is four millimeters.

11. An elevator system, comprising:
  an elevator car disposed in a hoistway and movable along the hoistway; and
  a frictional damper disposed at the elevator car, the frictional damper including:
    one or more friction pads configured to move between a first position defined by an air gap between the one or more friction pads and a guide rail, and a second positon defined by engagement of the one or more friction pads to the guide rail; and
    at least one actuation unit to urge the one or more friction pads into and out of engagement with the guide rail, the at least one actuation unit including:
      at least one hydraulic actuator operably connected to the one or more friction pads to urge movement of the one or more friction pads into and out of engagement with the guide rail via hydraulic fluid pressure, the at least one hydraulic actuator including:
        a piston chamber containing a volume of hydraulic fluid; and
        a hydraulic piston disposed in the piston chamber and operably connected to the one or more friction pads;
      an electromagnetic actuator configured to selectably urge hydraulic fluid to apply a force to the hydraulic piston, thereby urging the movement of the one or more friction pads;
    wherein the fluid level in the piston chamber of the hydraulic actuator is increased to maintain a constant air gap between the one or more friction pads and the guide rail at the first position to compensate for wear of the one or more friction pads.

12. The elevator system of claim 11, wherein a first friction pad of the one or more friction pads is disposed at a first lateral side of the guide rail and a second friction pad of the one or more friction pads is disposed at a second lateral side of the guide rail, opposite the first lateral side.

13. The elevator system of claim 12, wherein the at least one hydraulic actuator and the electromagnetic actuator are both disposed at the first lateral side and operably connected to the first friction pad.

14. The elevator system of claim 12, wherein the at least one actuation unit includes:
  a first actuation unit operably connected to the first friction pad; and
  a second actuation unit operably connected to the second friction pad.

15. The elevator system of claim 12, an actuation unit of the at least one actuation unit includes:
  a first hydraulic actuator of the at least one hydraulic actuator operably connected to the first friction pad;
  a second hydraulic actuator of the at least one hydraulic actuator operably connected to the second friction pad; and
  a shared electromagnetic actuator operably connected to each of the first hydraulic actuator and the second hydraulic actuator.

16. The elevator system of claim 11, further comprising a hydraulic reservoir in fluid communication with the at least one hydraulic actuator, the hydraulic reservoir configured to increase a fluid level in the piston chamber to compensate for wear of the one or more friction pads.

17. The elevator system of claim 16, further comprising a fluid level sensor disposed at the hydraulic reservoir.

18. The elevator system of claim 11, further comprising one or more pad wear sensors disposed at the one or more friction pads.

* * * * *